Patented July 6, 1937

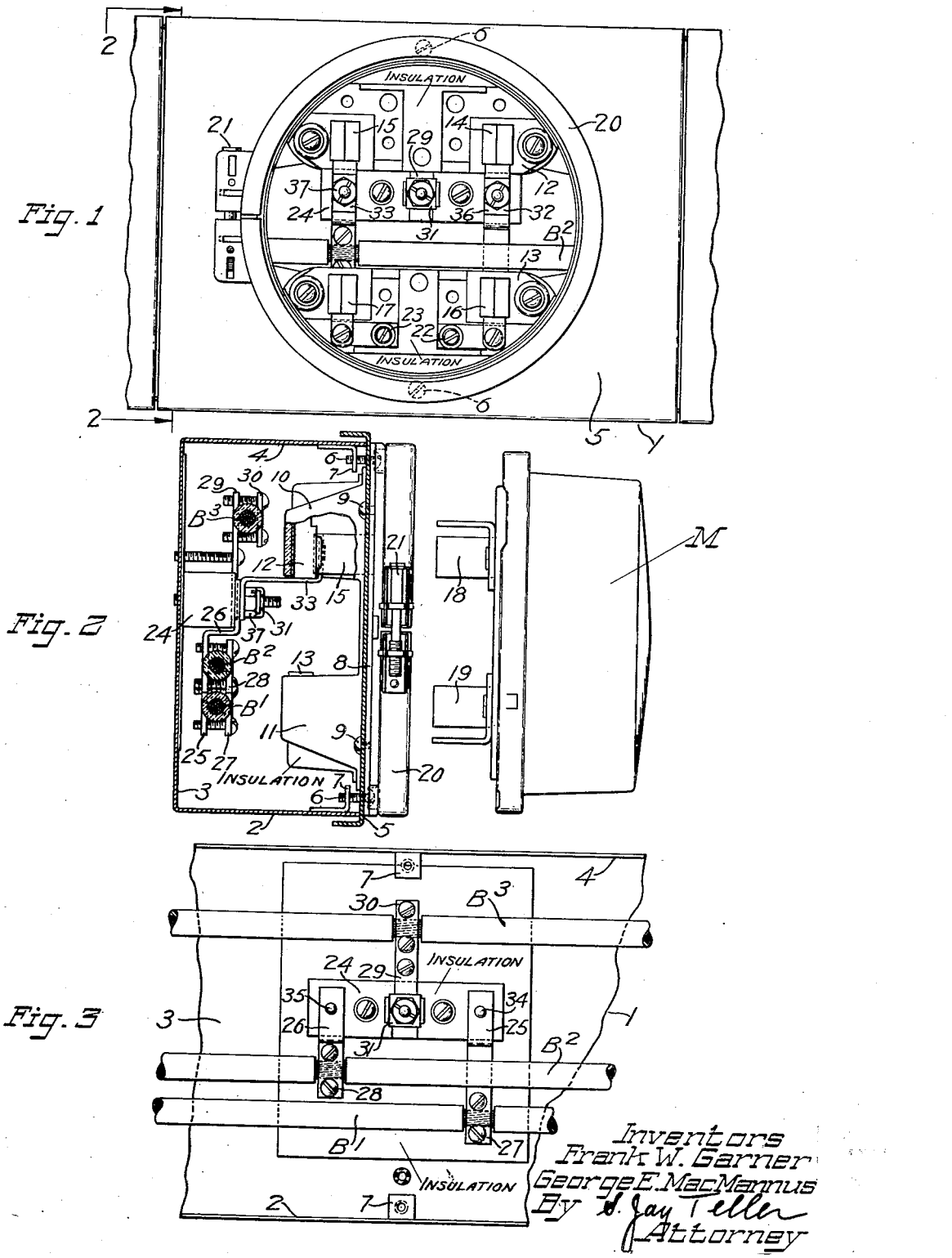

2,086,495

UNITED STATES PATENT OFFICE 2,086,495

ELECTRIC METER CONNECTION APPLIANCE

Frank W. Garner, Norwood, Mass., and George E. MacMannus, West Hartford, Conn., assignors to Colt's Patent Fire Arms Manufacturing Co., Hartford, Conn., a corporation of Connecticut Application October 18, 1935, Serial No. 45,558

4 Claims. (Cl. 247—2)

The invention relates particularly to an electric meter connection appliance which includes a connection device adapted to be mounted at an opening in the cover of the trough or box with which it is associated and adapted to detachably support a meter especially designed for that purpose.

In an appliance of this character as heretofore made and used, the terminals for the attachment of the longitudinal bussing wires are carried directly by a connection device, which in turn is carried by the removable front cover. As the result of this arrangement, it is necessary to connect the bussing or circuit wires to their respective terminals after the connection device and the cover are in place, and such connection of the bussing wires is very difficult and troublesome by reason of the lack of sufficient working space.

In accordance with the present invention, the terminals for connection with the bussing wires are mounted on an insulating block in fixed position in the box and the meter connection device at the front is detachably connected with the terminals on the block. This permits the bussing wires to be connected to their respective terminals before the front cover and the connection device are put in place, thus allowing ample working space for making the desired connections.

In the accompanying drawing we have illustrated a representative embodiment of the invention, but it will be understood that the drawing is intended for illustrative purposes only and is not to be construed as defining or limiting the scope of the invention, the claims forming a part of this specification being relied upon for that purpose.

Of the drawing:

Fig. 1 is a fragmentary front view of a trough or box embodying the invention, the detachable meter being omitted.

Fig. 2 is a side view showing the meter connection appliance, the enclosing box being shown in section along the line 2—2 of Fig. 1. In this view the meter is shown detached from the meter connection device.

Fig. 3 is a front view showing the insulating block at the rear and the bussing terminals thereon.

Referring to the drawing, 1 represents as an entirety a box adapted for containing service or bussing wires and also load wires. The box 1 may be a trough adapted for cooperation with two or more meters or it may be a shorter unit with side walls at the end and adapted for cooperation with only a single meter. As shown, it may be assumed that the trough is adapted for at least three meters, but the parts associated with only a single meter are shown.

The trough 1 is provided with a top wall 2, with a rear wall 3, and a bottom wall 4. At the front is a removable cover 5 which is adapted to be secured in place in any convenient way, as for instance by screws 6, 6 entering threaded holes in ears 7, 7 formed on the top and bottom walls.

The front cover 5 is provided with a large circular opening at which is mounted a meter connection device adapted to detachably support a meter especially designed for that purpose. The device as illustrated serves not only for establishing the necessary electrical connections with the meter but also serves in conjunction with the meter itself to provide the necessary protective relationship between the meter and the box so as to prevent access to any conducting parts so long as the meter remains in place.

Each meter connection device as shown comprises a metallic ring 8 which is mounted at the said opening in the front cover 5 and which is suitably held in place on the cover, as for instance by means of screws 9, 9. Carried by the ring are inward projections 10 and 11 which serve to support insulating blocks 12 and 13, positioned within the box and spaced apart vertically as shown. The blocks 12 and 13 carry sockets or clips 14, 15 and 16, 17 adapted to mechanically engage and provide electrical connection with conductor blades 18 and 19 projecting rearward from the meter M. When the blades 18 and 19 of the meter have been fully engaged with the clips 14, 15 and 16, 17 of the connection appliance, the meter may be locked or clamped to the ring 8 by means of a suitable split ring 20. The end portions of the ring 20 may be drawn together by means of a screw 21 and may be suitably locked or sealed.

Mounted on the meter connection device, and preferably on the lower insulating block 13 thereof, are wire terminals 22 and 23, which are electrically connected respectively with the clips 16 and 17. These terminals are adapted for connection with suitable load wires for the particular customer served by the meter M.

Mounted in a fixed position in the box and preferably on the rear wall thereof is an insulating block 24. Conductors 25 and 26 are secured to the block 24 at the front thereof and electrically connected with these conductors are terminals 27 and 28 adapted for connection with bussing or circuit wires $B^1$ and $B^2$. Preferably there is also carried by the block 24 a conductor 29 provided with a terminal 30 for connection with a neutral bussing or circuit wire $B^3$ and also carrying a terminal 31 adapted for connection with a neutral load wire.

Two rigid conductors 32 and 33 are carried by the meter connection device and preferably by the upper insulating block 12 thereof. These conductors are electrically connected respectively with the clips 14 and 15. The said rigid conductors 32 and 33 are so formed and so positioned as to engage the respective conductors 25 and 26 on the rear block 24 when the front cover and the meter connection device are in their normal positions.

Preferably, in order to provide a more effective mechanical and electrical connection between the conductors 32, 33 and the conductors 25, 26, screws 34, 35 are provided which project forward from the conductors 25, 26 and are adapted to extend through holes in the rear portions of the conductors 32, 33. Nuts 36 and 37 are provided which are adapted to engage the screws 34, 35, and these nuts when tightened serve to rigidly clamp the conductors 32, 33 against the conductors 25, 26 so as to provide good electrical connections.

From the foregoing description it will be apparent that the bussing or circuit wires can be put in place and connected to their respective terminals, as shown in Fig. 3, without any interference or obstruction by the front cover or the meter connection device carried thereby. After the circuit wires have been placed and connected, as shown, the front cover and the meter connection device can be put in place, as shown in Figs. 1 and 2, the conductors 32, 33 on the said device coming into engagement with the conductors 25, 26 on the rear block 24. The nuts 36, 37 can then be put in place as described, the said nuts being readily accessible from the front through the space between the two insulating blocks 12 and 13.

The three load wires can be properly located in the trough or box, being inserted for instance through a suitable knock-out opening, before the cover and the meter connection device thereon have been put in place, and the neutral load wire can be connected to the terminal 30. Thereafter, the cover and the meter connection device can be put in place and connected, after which the two other load wires can be connected to the load terminals 22 and 23. After that, the meter M can be connected to the connection device and clamped in the usual way.

What we claim is:

1. In a device of the class described, the combination of a trough or box adapted for containing bussing or circuit wires and having a large opening in the front wall thereof, an insulating block in fixed position in the box and having conductors thereon, terminals electrically connected with the conductors on the block and connectible with the respective bussing or circuit wires, a meter connection device detachably mounted at the opening in the front wall of the box and having a large opening therethrough from front to rear, a meter having rearward projecting terminals or blades normally detachably engaged with clips forming part of the connection device, the said meter normally serving in conjunction with the connection device to entirely close the opening in the front wall of the box, and two rigid conductors on the detachable connection device formed and positioned to engage the respective conductors on the block when the connection device is in place, the said conductors being visible and accessible through the opening in the connection device when the meter is not in place and the said conductors being entirely concealed and inaccessible when the meter is in place.

2. In a device of the class described, the combination of a trough or box adapted for containing bussing or circuit wires and having a large opening in the front wall thereof, an insulating block in fixed position in the box and having conductors thereon, terminals electrically connected with the conductors on the block and connectible with the respective bussing or circuit wires, a meter connection device mounted on the front wall of the box at the opening therein and detachable independently of the front wall, the said connection device having a large opening therethrough from front to rear, a meter having rearward projecting terminals or blades normally detachably engaged with clips forming part of the detachable connection device, the said meter normally serving in conjunction with the connection device to entirely close the opening in the front wall of the box, and two rigid conductors on the detachable connection device formed and positioned to engage the respective conductors on the block when the connection device is in place, the said conductors being visible and accessible through the opening in the connection device when the meter is not in place and the said conductors being entirely concealed and inaccessible when the meter is in place.

3. In a device of the class described, the combination of a trough or box adapted for containing bussing or circuit wires and having a large opening in the front wall thereof, an insulating block in fixed position in the box and having conductors thereon, terminals electrically connected with the conductors on the block and connectible with the respective bussing or circuit wires, a meter connection device detachably mounted at the opening in the front wall of the box and having a large opening therethrough from front to rear, a meter having rearward projecting terminals or blades normally detachably engaged with clips forming part of the connection device, the said meter normally serving in conjunction with the connection device to entirely close the opening in the front wall of the box, two rigid conductors on the detachable connection device formed and positioned to engage the respective conductors on the block when the connection device is in place, and means for rigidly connecting the conductors on the connection device with the conductors on the block, the said means being visible and accessible through the opening in the connection device when the meter is not in place and the said conductors being entirely concealed and inaccessible when the meter is in place.

4. An electric meter connection appliance comprising in combination, a trough or box adapted for containing bussing or circuit wires and having a removable front cover, an insulating block in fixed position at the rear of the box and having conductors thereon, terminals electrically connected with the conductors on the block and connectible with the respective bussing or circuit wires, a device mounted at an opening in the detachable front cover and adapted for detachably supporting an electric meter, the said device including two spaced insulating blocks with conducting meter connection elements thereon, two rigid conductors on the detachable device formed and positioned to engage the respective conductors on the rear insulating block when the said device is in place, and means accessible between the insulating blocks of the detachable device for rigidly connecting the conductors on the device with the conductors on the rear block.

FRANK W. GARNER.
GEORGE E. MacMANNUS.